United States Patent
Basak et al.

(10) Patent No.: US 11,625,032 B2
(45) Date of Patent: Apr. 11, 2023

(54) METHOD AND SYSTEM FOR DIAGNOSING ANOMALY IN A MANUFACTURING PLANT

(71) Applicant: Tata Consultancy Services Limited, Mumbai (IN)

(72) Inventors: Arghya Basak, Pune (IN); Pradeep Rathore, Pune (IN); Sri Harsha Nistala, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/753,834

(22) PCT Filed: Sep. 26, 2020

(86) PCT No.: PCT/IN2020/050829
§ 371 (c)(1),
(2) Date: Mar. 16, 2022

(87) PCT Pub. No.: WO2021/059302
PCT Pub. Date: Apr. 1, 2021

(65) Prior Publication Data
US 2022/0334574 A1 Oct. 20, 2022

(30) Foreign Application Priority Data
Sep. 27, 2019 (IN) .............................. 201921038383

(51) Int. Cl.
*G05B 23/02* (2006.01)
(52) U.S. Cl.
CPC .................................. *G05B 23/024* (2013.01)
(58) Field of Classification Search
CPC ........................... G05B 23/024; G05B 23/0283
See application file for complete search history.

(56) References Cited

U.S. PATENT DOCUMENTS 6,917,839 B2  7/2005  Bickford
8,990,145 B2  3/2015  Lingenfelder et al.
(Continued)

OTHER PUBLICATIONS

Marzat, Julien et al., "Cooperative fault detection and isolation in a surveillance sensor network: a case study", IFAC—PapersOnLine, Date: 2018, vol. 51, Issue: 24, pp. 790-797, Publisher: Elsevier, https://reader.elsevier.com/reader/sd/pii/S2405896318323838?token= 780C03CADA6582FD17B2D52B930DE533D10D6A79044C954B 47551A7C54DCF19537A03A6300ACFC4F351A6F3F1C5A1CC1 &originRegion=eu-west-1&originCreation=20210823084136.

(Continued)

*Primary Examiner* — Mischita L Henson
(74) *Attorney, Agent, or Firm* — Finnegan, Henderson, Farabow, Garrett & Dunner LLP (57) ABSTRACT

Industrial plants involve a large amount of equipment, which generate a large amount of data. By analyzing this data, the operator can diagnose anomaly in the plant. Analyzing this data is difficult and time taking task. A method and system for diagnosing anomaly in an industrial system in a time efficient and convenient manner has been provided. The system is configured to diagnose the anomaly by finding out one or more sensors responsible for the anomaly. The present disclosure treats the anomaly detection model as a score generating function. Whenever for a particular instance the score given by the anomaly detection model crosses a pre-determined threshold, anomaly is reported and the diagnosis algorithm is triggered. The system is configured to diagnose the anomaly predicted in case of time series as well as non-time series data.

11 Claims, 6 Drawing Sheets

(56) References Cited

U.S. PATENT DOCUMENTS

| | | | |
|---|---|---|---|
| 9,483,049 B2* | 11/2016 | Maeda | G06K 9/00536 |
| 9,779,495 B2 | 10/2017 | Shibuya et al. | |
| 9,933,338 B2 | 4/2018 | Noda et al. | |
| 2012/0084251 A1 | 4/2012 | Lingenfelder et al. | |
| 2015/0095003 A1* | 4/2015 | Horowitz | G05B 17/02 |
| | | | 703/6 |
| 2015/0363925 A1 | 12/2015 | Shibuya et al. | |

OTHER PUBLICATIONS

Khamis, Hassan Shee et al., "Application of k—Nearest Neighbour Classification in Medical Data Mining", Computer Science, Date: Apr. 2014, Publisher: Semantic Scholar, https://www.researchgate.net/publication/270163293_Application_of_k-Nearest_Neighbour_Classification_in_Medical_Data_Mining/link/54a249fd0cf256bf8baf7fff/download.

International Search Report and Written Opinion dated May 19, 2021, in International Application No. PCT/IN2020/050829; 8 pages.

* cited by examiner

METHOD AND SYSTEM FOR DIAGNOSING ANOMALY IN A MANUFACTURING PLANT

CROSS-REFERENCE TO RELATED APPLICATIONS AND PRIORITY

This application is an US National Stage Filing and claims priority from International Application No. PCT/IN2020/050829, filed on Sep. 26, 2020, which application claims priority from Indian provisional application no. 201921038383, filed on Sep. 27, 2019. The entire contents of the aforementioned applications are incorporated herein by reference.

TECHNICAL FIELD

The disclosure herein generally relates to the field of sensor data analytics, and, more particularly, to a method and system for diagnosing anomaly in an industrial system by identifying sensors responsible for the same.

BACKGROUND

Manufacturing and process industries such as iron and steel, power, oil and gas, refineries, etc. comprise of multiple operations and processes that take place in a sequential or parallel manner. These operations involve a wide range of industrial equipment such as furnaces, chemical reactors, steam turbines, gas turbines, bio-reactors, heat exchangers, boilers, condensers, compressors, valves, etc. Extensive instrumentation of these industries led to the generation of massive amounts of data from various process and equipment sensors, mobile and wireless logs, software logs, at a high frequency. This multivariate sensor data represents the true behavior of industrial plants under various operational states such as steady state operation, unsteady state operation, and different operational regimes. For this reason, industrial data can be used to perform predictive maintenance (or condition based maintenance or just-in-time maintenance) of industrial processes and equipment wherein maintenance is scheduled only when the health of the process or equipment falls below a certain threshold, leading to lower cost of inventory and maintenance.

Anomaly detection refers to identification of atypical patterns in data that do not conform to a notion of normal behavior of a process or equipment. Anomaly diagnosis, also known as fault localization, aims to identify sensors contributing to the detected anomaly and to pinpoint the root cause of the anomaly. Anomaly detection and diagnosis for industrial systems is a challenging task due to the complex behavior of processes and equipment, interactions among sensors, corrective actions of control systems and variability in anomalous behavior.

With rapid development in the area of data science, scientists and engineers are dealing with increasingly complex systems using data based approach. A large class of problems in data science fall under the category of anomaly detection. In such problems, there are very few anomalous examples. So, standard binary classification algorithms do not work well.

Though a number of data-driven techniques for anomaly detection in industrial data exist in literature, techniques for anomaly diagnosis are very limited. Lot of standard algorithms are available in ready-to implement form for anomaly detection like 1-class support vector machine (SVM), isolation forest algorithm, Gaussian mixture model, Kernel Density estimation etc. But, there is no standard technique for finding the sensor responsible for anomalous behavior of the model. Some people use $T^2$ statistics and Q statistics in principle component analysis (PCA), recursive feature elimination in 1-class SVM to do the diagnosis.

T-square statistics and Q-statistics based anomaly diagnosis are limited in capturing the temporal effect of various sensors. They treat data as non-time series and then calculate the contribution of various sensors. There is a lack of guidelines about how to do diagnosis after detection in case of one class SVM, Kernal density estimation, Isolation forest etc.

SUMMARY

Embodiments of the present disclosure present technological improvements as solutions to one or more of the above-mentioned technical problems recognized by the inventors in conventional systems. For example, in one embodiment, a system for diagnosing anomaly in an industrial system is provided. The system comprises a first set of sensors, a second set of sensors, one or more hardware processors and a memory in communication with the one or more hardware processors. The first set of sensors provides multivariate time series data. The second set of sensors provides multivariate non-time series data. The one or more hardware processors further configured to perform the steps of: Convert the multivariate time series data into a plurality of finite sized time windows; Compute a plurality of features for each of the plurality of finite sized time windows; Preprocess the plurality of features and the multivariate non-time series data received from the second set of sensors to get normalized plurality of features and normalized multivariate non-time series data; Generate an anomaly detection model using the normalized plurality of features and the normalized multivariate non-time series data; Generate an anomaly score for each of a plurality of instances in the industrial system using the anomaly detection model, wherein the anomaly score is indicative of an anomalous instance in the industrial system if the anomaly score is more than a predefined threshold; Identify a reference instance corresponding to the anomalous instance, wherein the reference instance lies on or within a decision boundary, wherein the decision boundary encloses a predetermined percentage of non-anomalous instances; Calculate a diagnosis score corresponding to each of the first set and the second set of sensors using the anomaly detection model, the anomalous instance and the reference instance; Sort the diagnosis scores corresponding to each of the sensors either in the decreasing or the increasing order; And, identify a predefined number of sensors as the anomalous sensors in the resultant sorting, wherein the anomalous sensors are indicative of the anomaly in the industrial system.

In another aspect, a method for diagnosing anomaly in an industrial system is provided. Initially, multivariate time series data is received from a first set of sensors. The multivariate time series data is then converted into a plurality of finite sized time windows. Further, a plurality of features is computed for each of the plurality of finite sized time windows. In the next step, multivariate non-time series data is received from a second set of sensors. Further, the plurality of features and the multivariate non-time series data received from the second set of sensors are preprocessed to get normalized plurality of features and normalized multivariate non-time series data. In the next step, an anomaly detection model is generated using the normalized plurality of features and the normalized multivariate non-time series data. Further, an anomaly score is generated for each of a plurality of instances in the industrial system using the anomaly detection model, wherein the anomaly score is indicative of an anomalous instance in the industrial system if the anomaly score is more than a predefined threshold. In the next step, a reference instance is identified corresponding to the anomalous instance, wherein the reference instance lies on or within a decision boundary, wherein the decision boundary encloses a predetermined percentage of non-anomalous instances. Further, a diagnosis score is calculated corresponding to each of the first set and the second set of sensors using the anomaly detection model, the anomalous instance and the reference instance. Later, the diagnosis scores are sorted corresponding to each of the sensors either in the decreasing or the increasing order. And finally, a predefined number of sensors are identified as the anomalous sensors in the resultant sorting, wherein the anomalous sensors are indicative of the anomaly in the industrial system.

In yet another aspect, one or more non-transitory machine readable information storage mediums comprising one or more instructions which when executed by one or more hardware processors cause diagnosing anomaly in an industrial system is provided. Initially, multivariate time series data is received from a first set of sensors. The multivariate time series data is then converted into a plurality of finite sized time windows. Further, a plurality of features is computed for each of the plurality of finite sized time windows. In the next step, multivariate non-time series data is received from a second set of sensors. Further, the plurality of features and the multivariate non-time series data received from the second set of sensors are preprocessed to get normalized plurality of features and normalized multivariate non-time series data. In the next step, an anomaly detection model is generated using the normalized plurality of features and the normalized multivariate non-time series data. Further, an anomaly score is generated for each of a plurality of instances in the industrial system using the anomaly detection model, wherein the anomaly score is indicative of an anomalous instance in the industrial system if the anomaly score is more than a predefined threshold. In the next step, a reference instance is identified corresponding to the anomalous instance, wherein the reference instance lies on or within a decision boundary, wherein the decision boundary encloses a predetermined percentage of non-anomalous instances. Further, a diagnosis score is calculated corresponding to each of the first set and the second set of sensors using the anomaly detection model, the anomalous instance and the reference instance. Later, the diagnosis scores are sorted corresponding to each of the sensors either in the decreasing or the increasing order. And finally, a predefined number of sensors are identified as the anomalous sensors in the resultant sorting, wherein the anomalous sensors are indicative of the anomaly in the industrial system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

Figure 1:
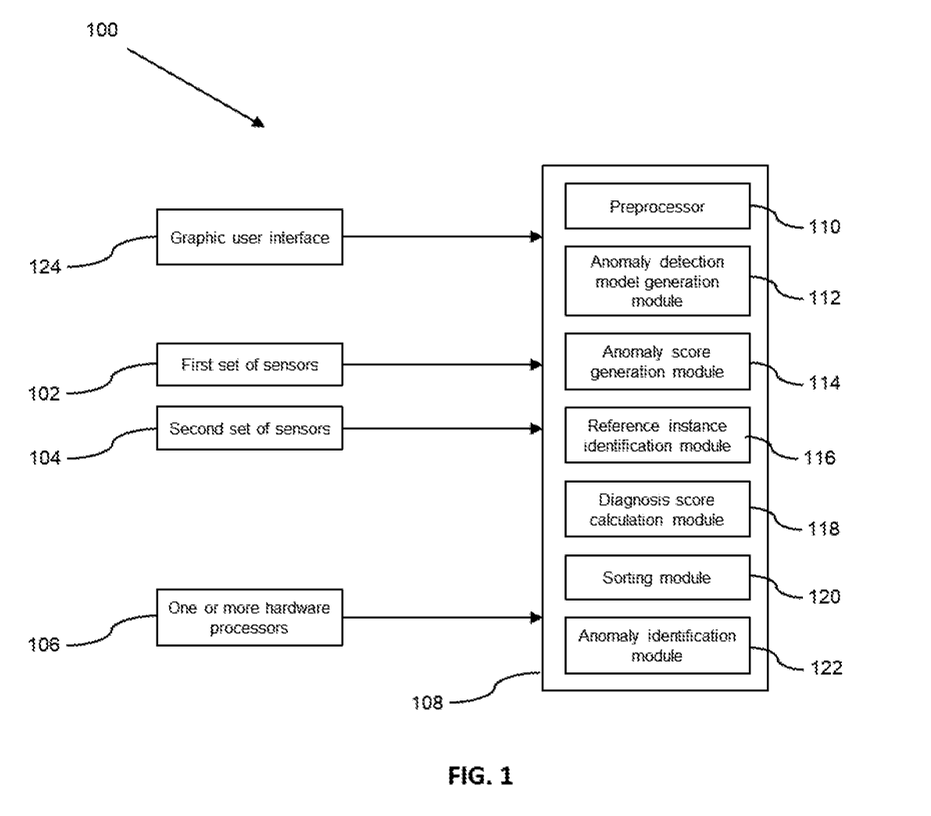
FIG. 1 illustrates a block diagram of a system for diagnosing anomaly in an industrial system according to some embodiments of the present disclosure.
Figure 2:
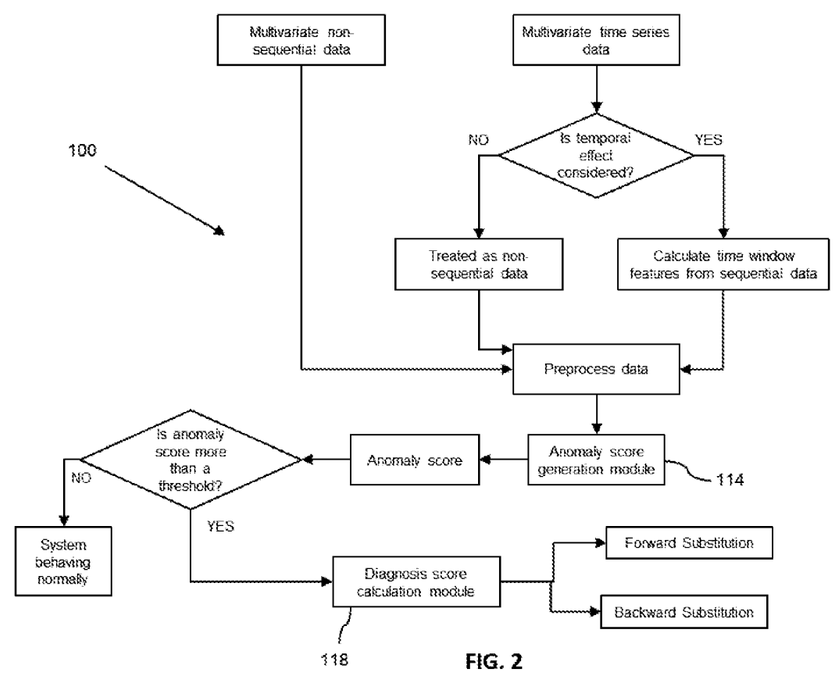
FIG. 2 shows a schematic overview of the system for diagnosing anomaly in the industrial system according to some embodiments of the present disclosure.

A block diagram of a system 100 for diagnosing anomaly in an industrial system such as a manufacturing plant is shown in FIG. 1. Going further in the disclosure, the term industrial system and the manufacturing plant can be used interchangeably. The system 100 is configured to diagnose the anomaly by finding out one or more sensors responsible for the anomaly. The present disclosure treats the anomaly detection model as a score generating function. Whenever for a particular instance the score given by the anomaly detection model crosses a pre-determined threshold, anomaly is reported and the diagnosis process is triggered. The system 100 is configured to diagnose the anomaly predicted in case of time series as well as non-time series data.

According to an embodiment of the disclosure, a block diagram of the system 100 for diagnosing anomaly in the industrial system such as the manufacturing plant is shown in FIG. 1. The operation of the system 100 for diagnosing anomaly in the manufacturing plant is explained in schematic workflow of FIG. 2. The system 100 comprises a first set of sensors 102 and a second set of sensors 104, one or more hardware processors 106 and a memory 108 in communication with the one or more hardware processors 106. The one or more hardware processors 106 are configured to fetch a set of instructions from the memory 108. The memory 108 further comprises a plurality of modules for performing various functions. The plurality of modules includes a preprocessor 110, an anomaly detection model generation module 112, an anomaly score generation module 114, a reference instance identification module 116, a diagnosis score calculation module 118, a sorting module 120 and an anomaly identification module 122.

The data received from the first and the second set of sensors 102 and 104 is used as an input to the system 100. There can be two kinds of incoming data namely multivariate time-series data received from the first set of sensors 102 and multivariate non time series data or non-sequential data received from the second set of sensors 104. For example, data from any industrial process or equipment is multivariate time series in nature. Examples of industrial equipment include but are not limited to, pumps, compressor, turbine, and so on. Examples of industrial processes includes but are not limited to, Catalytic converter, Tennese Eastman process, and so on.

In case of multivariate time series data, if temporal effect is ignored, the multivariate time series data can be treated in same way as multivariate non time series data. In this case, temporal effect may not be captured and only multivariate effects are captured. Also, the sensor data may be directly used as features in the preprocessor 110. If the temporal effect is considered in the multivariate time series data, then the multivariate time series data is converted in a plurality of finite sized time windows in overlapping or non-overlapping manner. A plurality of features is then computed for each of the plurality of finite sized time windows. For each time window various statistical parameters like mean, median, minimum, maximum, skewness, kurtosis etc. are computed for all the first set of sensors 102.

The examples of multivariate non-time series data may include data coming out of the batch manufacturing processes like casting, forging etc.

According to an embodiment of the disclosure, the memory 108 comprises the preprocessor 110. In the preprocessor 110, for non-sequential or non-time series data, missing data is imputed by multivariate algorithms if the missing data percentage is less than a predefined percentage number. Instances containing more than the predefined percentage number of missing data are not considered for anomaly detection model building. In case of multivariate time series data missing data is taken care of during time window feature extraction. In an example the predefined percentage number may be selected as 10%.

The preprocessor 110 is further configured to preprocess the plurality of features and the multivariate non-time series data received from the second set of sensors 104 to get normalized plurality of features and normalized multivariate non-time series data. The features are normalized using standard techniques such as z-normalization, min-max normalization etc.

The system 100 may also comprise a graphic user interface (GUI) 124 as shown in FIG. 1. The GUI 124 of the system 100 which is used by a user or an operator of the system 100. The user can manually provide the input to the system 100 using the GUI 124, instead of the first set of sensors 102 and the second set of sensors 104. The GUI 124 is also configured to display the detected anomaly of the system 100. The GUI 124 is accessible to the user via smartphones, laptop or desktop configuration thus giving the user the freedom to interact with the system 100 from anywhere anytime. The graphic user interface 124 may include a variety of software and hardware interfaces, for example, interfaces for peripheral device(s), such as a keyboard, a mouse, an external memory, a camera device, and a printer. The interfaces 124 can facilitate multiple communications within a wide variety of networks and protocol types, including wired networks, for example, local area network (LAN), cable, etc., and wireless networks, such as Wireless LAN (WLAN), cellular, or satellite.

According to an embodiment of the disclosure, the system 100 comprises the anomaly detection model generation module 112. The anomaly detection model generation module 112 is configured to generate an anomaly detection model using the normalized plurality of features and the normalized multivariate non-time series data. The anomaly detection model can be generated using any of the technique such as a density based algorithm, a tree based algorithm, a one-class classification algorithm, a nearest neighbor based algorithm or a neural network based algorithm.

According to an embodiment of the disclosure, the memory 108 comprises the anomaly score generation module 114. The anomaly score generation module 114 is configured to generate an anomaly score for each of a plurality of instances in the industrial system using the anomaly detection model. The anomaly score is indicative of an anomalous instance in the industrial system if the anomaly score is more than a predefined threshold. If the anomaly score is more than the predefined threshold (decide by the user), the anomaly is being reported and the diagnostics processes starts to find the sensor responsible for the anomalous behaviour. If the anomaly score is less than the predefined threshold, it implies that the system is behaving normally and also no corrective measures are necessary.

Figure 3:
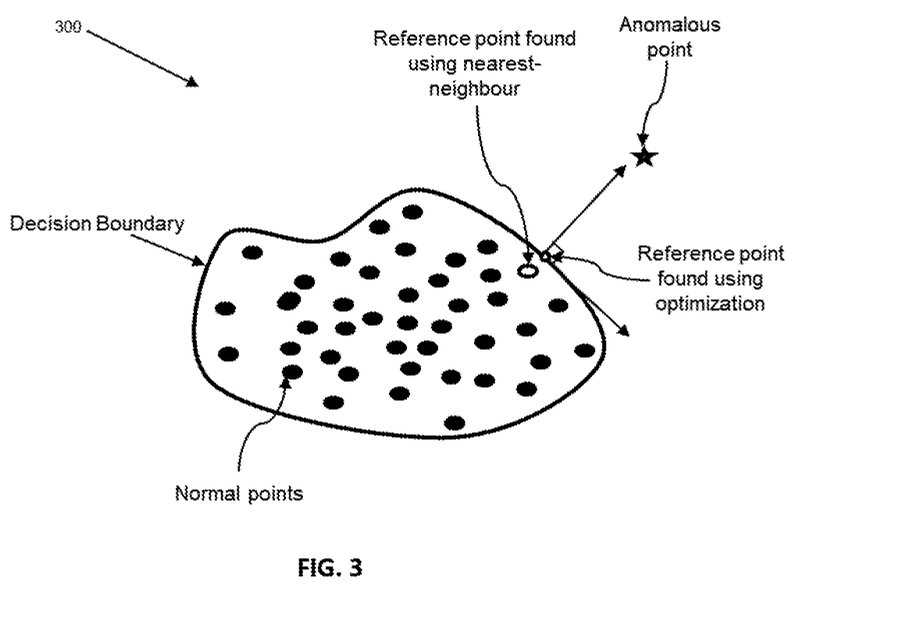
FIG. 3 shows a schematic of a 2D dataset for reference point identification according to some embodiments of the present disclosure.
Figure 4:
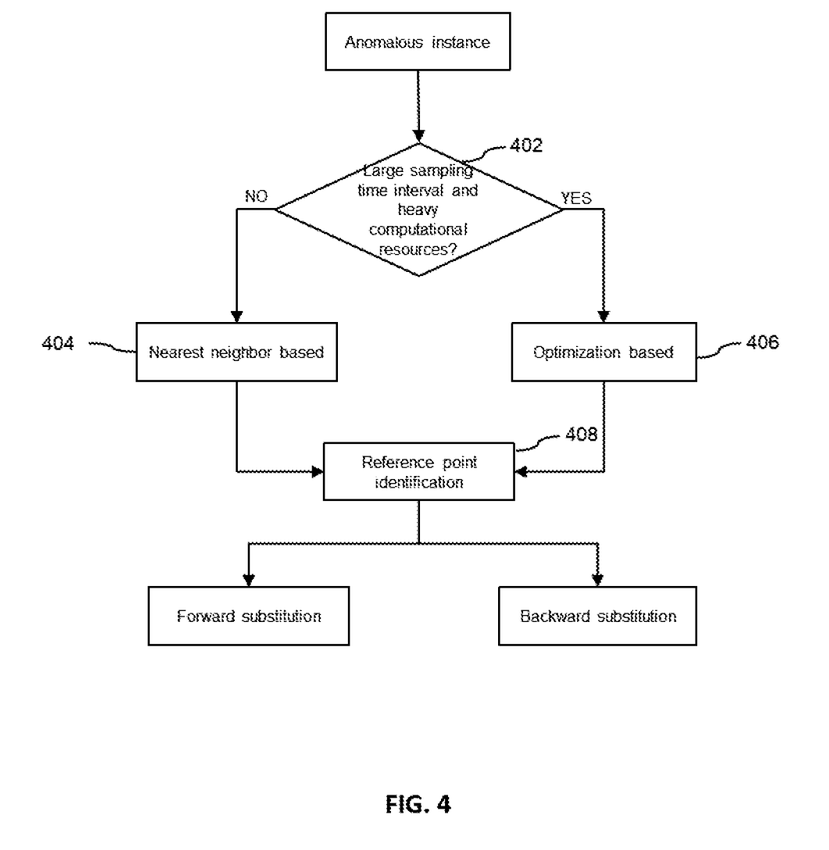
FIG. 4 is a flowchart showing the steps involved in the diagnosis of anomalous sensor in the industrial system in accordance with some embodiments of the present disclosure.

According to an embodiment of the disclosure, the memory 108 further comprises the reference instance identification module 116 The reference instance identification module 116 is configured to identify a reference instance corresponding to the anomalous instance. The reference instance lies on or within a decision boundary as shown in FIG. 3. The decision boundary encloses a predetermined percentage of non-anomalous instances. The technique to select reference point is chosen based on the sampling time and computational resources as shown in the flowchart of FIG. 4. At step 402, it is checked if the sampling time is large or sufficient computational resources are available. At step 404, if Yes, then optimization based novel technique is used to find the reference point. Else, at step 406, nearest neighbor based algorithm is used to select the reference point. The detailed explanation of the same is provided below. At step 408, reference points are identified depending on the selected method.

A schematic diagram of a 2D dataset 300 is shown in FIG. 3. A decision boundary is obtained. The decision boundary is a hypothetical boundary which encloses all the normal data points. In the real time scenario, the set of normal data points can be updated regularly. The decision boundary is a curve in 2D but a hypersurface in N dimension. The end objective is to find the nearest normal point lying on or within the decision boundary. In case of small sampling interval or non-availability of large computational resources, the reference point is selected using the nearest neighbor technique. Otherwise, the optimization technique is used to find the reference point. The optimization technique is explained below.

The optimization problem to solve can be formulated as follows in equation (1):

$$\mathrm{argmin}_{\bar{x}_{ref}} \|\bar{x}_{anomalous} - \bar{x}\mathrm{ref}\|^2 \qquad (1)$$

$$\text{subject to, score\_func}(\bar{x}_{ref}) \leq \text{threshold}$$

where, $\bar{x}_{anomalous}$=feature vector for the anomalous instance, $\bar{x}_{ref}$=reference vector to be found using optimization algorithm, score_func=anomaly detection model which gives anomaly score, and threshold=threshold for the anomaly detection model.

By solving the above mentioned optimization problem, the reference point can be identified, which is a normal data point lying on the decision boundary. The initialization of $\bar{x}_{ref}$ is the nearest point found using the nearest neighbor algorithm. The number of steps used to find the reference point by solving the optimization technique is decided by the available computational resources and sampling time.

According to an embodiment of the disclosure, the memory 108 comprises the diagnosis score calculation module 118 and the sorting module 120. The diagnosis score calculation module 118 is configured to calculate a diagnosis score corresponding to each of the first set of sensors 102 and the second set of sensors 104 using the anomaly detection model, the anomalous instance and the reference instance. Further, the sorting module 120 is configured to sort the diagnosis scores corresponding to each of the sensors either in the decreasing or the increasing order.

According to an embodiment of the disclosure, once the reference instance is selected, forward substitution and backward substitution methods are used to find the sensors responsible for anomalous behavior of the model as shown ion FIG. 4.

Forward Substitution—In this method, for each sensor i, a new artificial data point ($\bar{x}_{new}^i$) is created by replacing one sensor at a time in the reference data point ($\bar{x}_{ref}$) by $i^{th}$ sensor of the anomalous data point ($\bar{x}_{anomalous}$). Further, the increase in anomaly score between new ($\bar{x}_{ref}^i$) and reference data point ($\bar{x}_{ref}$) is calculated by using the anomaly detection model itself as shown below in equation (2):

$$\Delta score^i = score\_func(\bar{x}_{ref}^i) - score\_func(\bar{x}_{ref}) \quad (2)$$

An empirical ranking of sensors is provided based on sorting $\Delta score$ in decreasing order. In case of time series data, $i^{th}$ new artificial data point is generated by substituting all the time window features corresponding to the $i^{th}$ sensor simultaneously. The forward substitution method is recommended for anomaly diagnosis in case of few sensor going faulty.

Backward Substitution—In this method, for each sensor i, a new artificial data point ($\bar{x}_{ref}^i$) is created by replacing one sensor at a time in the anomalous data point ($\bar{x}_{anomalous}$) by $i^{th}$ sensor of the reference data point ($\bar{x}_{ref}$). Further the decrease in anomaly score is calculated between anomalous ($\bar{x}_{anomalous}$) and the new data point ($\bar{x}_{ref}^i$) by using the anomaly detection model itself as shown below in equation (3):

$$\Delta score^i = score\_func(\bar{x}_{anomalous}) - score\_func(\bar{x}_{ref}^i) \quad (3)$$

An empirical ranking of sensors based on sorting $\Delta score$ is provided in the decreasing order. In case of time series data, $i^{th}$ new artificial data point is generated by substituting all the time window features corresponding to the $i^{th}$ sensor simultaneously. The backward Substitution is recommended for anomaly diagnosis in case of many sensor going faulty.

According to an embodiment of the disclosure, the memory 108 comprises the anomaly identification module 122. The anomaly identification module 122 is configured to identify a predefined number of sensors as the anomalous sensors in the sorting, wherein the anomalous sensors are indicative of the anomaly in the industrial system. The anomalous sensors are found among top few sensors of the empirical ranked list of sensors.

Figure 5A:
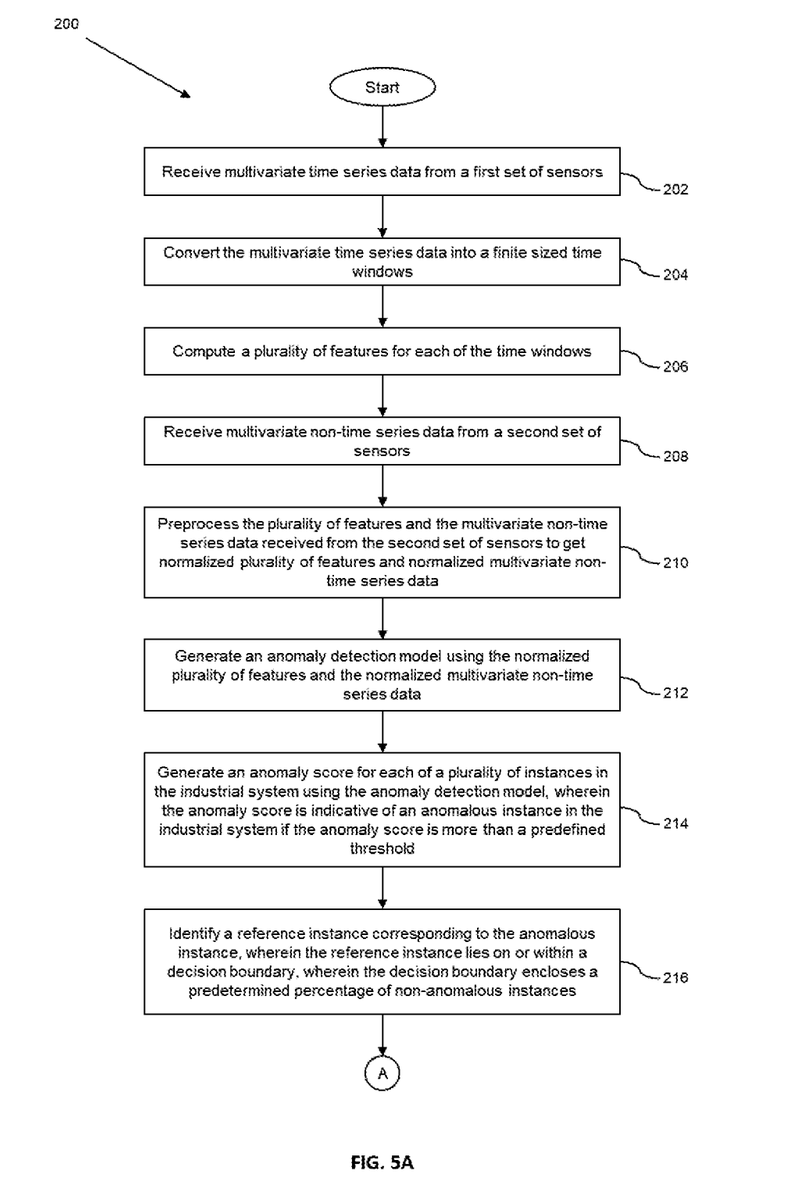
FIG. 5A-5B is a flow diagram illustrating a method of diagnosing anomaly in the industrial system in accordance with some embodiments of the present disclosure.
Figure 5B:
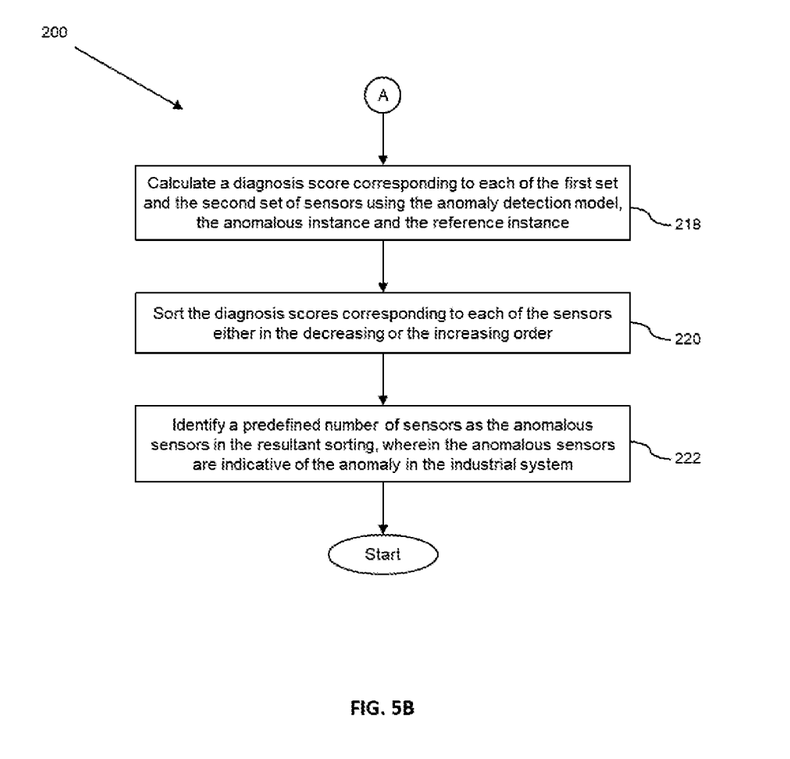

In operation, the method for diagnosing anomaly in the industrial system is shown in the flowchart 200 of FIG. 5A-5B. Initially at step 202, multivariate time series data is received from a first set of sensors. The multivariate time series data include data from any industrial process or equipment is multivariate time series in nature. Examples of industrial equipment include but are not limited to, pumps, compressor, turbine, and so on. Examples of industrial processes includes but are not limited to, Catalytic converter, Tennese Eastman process, and so on. At step 204, the multivariate time series data is converted into a plurality of finite sized time windows. Further at step 206, the plurality of features is computed for each of the plurality of finite sized time windows. Similarly, at step 208, the multivariate non-time series data is received from a second set of sensors. The multivariate non-time series data include batch manufacturing processes like casting, forging etc.

At step 210, the plurality of features and the multivariate non-time series data received from the second set of sensors is preprocessed to get normalized plurality of features and normalized multivariate non-time series data. Further at step 212, the anomaly detection model is generated using the normalized plurality of features and the normalized multivariate non-time series data. At step 214, the anomaly score is generated for each of a plurality of instances in the industrial system using the anomaly detection model, wherein the anomaly score is indicative of an anomalous instance in the industrial system if the anomaly score is more than a predefined threshold;

In the next step 216, a reference instance corresponding to the anomalous instance is identified, wherein the reference instance lies on or within a decision boundary, wherein the decision boundary encloses a predetermined percentage of non-anomalous instances. At step 218, a diagnosis score is calculated corresponding to each of the first set and the second set of sensors using the anomaly detection model, the anomalous instance and the reference instance. At step 220, the diagnosis scores are sorted corresponding to each of the sensors either in the decreasing or the increasing order. And finally at step 222, a predefined number of sensors are identified as the anomalous sensors in the resultant sorting, wherein the anomalous sensors are indicative of the anomaly in the industrial system.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problems related to the monitoring and diagnosing a plurality of equipment in the manufacturing and process industry. The embodiment, thus provides the method and system for diagnosing anomaly in industrial system by identifying the sensors involved.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method for diagnosing anomaly in an industrial system, the method comprising:
receiving multivariate time series data from a first set of sensors;
converting, via one or more hardware processors, the multivariate time series data into a plurality of finite sized time windows;
computing, via the one or more hardware processors, a plurality of features for each of the plurality of finite sized time windows;
receiving multivariate non-time series data from a second set of sensors;
preprocessing, via the one or more hardware processors, the plurality of features and the multivariate non-time series data received from the second set of sensors to get normalized plurality of features and normalized multivariate non-time series data;
generating, via the one or more hardware processors, an anomaly detection model using the normalized plurality of features and the normalized multivariate non-time series data;
generating, via the one or more hardware processors, an anomaly score for each of a plurality of instances in the industrial system using the anomaly detection model, wherein the anomaly score is indicative of an anomalous instance in the industrial system if the anomaly score is more than a predefined threshold;
identifying, via the one or more hardware processors, a reference instance corresponding to the anomalous instance, wherein the reference instance lies on or within a decision boundary, wherein the decision boundary encloses a predetermined percentage of non-anomalous instances, wherein the identification of the reference instance is performed using an optimization based algorithm;
calculating, via the one or more hardware processors, a diagnosis score corresponding to each of the first set of sensors and the second set of sensors using the anomaly detection model, the anomalous instance and the reference instance, wherein the diagnosis score is calculated using at least one of a forward substitution method and a backward substitution method, wherein the forward substitution method comprises calculation of difference between the anomaly score corresponding to one or more artificially generated instances and the anomaly score corresponding to the reference instance for each of the first and the second set of sensors;
sorting, via the one or more hardware processors, the diagnosis scores corresponding to each of the sensors in one of a decreasing order and an increasing order; and
identifying, via the one or more hardware processors, a predefined number of sensors as the anomalous sensors in the sorting, wherein the anomalous sensors are indicative of the anomaly in the industrial system.

2. The method according to claim 1 wherein the multivariate time series data is received from at least one of an industrial process or an equipment.

3. The method according to claim 1 wherein the normalized plurality of features is obtained using at least one of a z-normalization and a min-max normalization.

4. The method according to claim 1, wherein the anomaly detection model is generated using at least one of a density based algorithm, a tree based algorithm, a one-class classification algorithm, a nearest neighbor based algorithm or a neural network based algorithm.

5. The method according to claim 1, wherein the artificially generated instances for the first set of sensors are obtained by substituting numerical values of the plurality of features corresponding to each sensor amongst the first set of sensors in the reference instance with the corresponding values of the plurality of features of the same sensor from the anomalous instance.

6. The method according to claim 1, wherein the one or more artificially generated instances for the second set of sensors are obtained by substituting numerical values of the plurality of features corresponding to each sensor from amongst the second set of sensors in the reference instance with the corresponding value of the same sensor from the anomalous instance.

7. The method according to claim 1, wherein the backward substitution method comprises calculation of difference between the anomaly score corresponding to the anomalous instance and the anomaly score corresponding to the one or more artificially generated instances for each of the first set of sensors and the second set of sensors.

8. The method according to claim 1, wherein the one or more artificially generated instances for the first set of sensors are obtained by substituting numerical values of the plurality of features corresponding to each sensor from amongst the first set of sensors in the anomalous instance with the corresponding values of the plurality of features of the same sensor from the reference instance.

9. The method according to claim 1, wherein the artificially generated instances for the second set of sensors are obtained by substituting numerical values of each from amongst the second set of sensors in the anomalous instance with the corresponding value of the same sensor from the reference instance.

10. A system for diagnosing anomaly in an industrial system, the system comprising:
   a first set of sensors for providing multivariate time series data;
   a second set of sensors for providing multivariate non-time series data;
   one or more hardware processors; and
   a memory in communication with the one or more hardware processors, the one or more hardware processors further configured to perform the steps of:
      converting the multivariate time series data into a plurality of finite sized time windows;
      computing a plurality of features for each of the plurality of finite sized time windows;
      preprocessing the plurality of features and the multivariate non-time series data received from the second set of sensors to get normalized plurality of features and normalized multivariate non-time series data;
      generating an anomaly detection model using the normalized plurality of features and the normalized multivariate non-time series data;
      generating an anomaly score for each of a plurality of instances in the industrial system using the anomaly detection model, wherein the anomaly score is indicative of an anomalous instance in the industrial system if the anomaly score is more than a predefined threshold;
      identifying a reference instance corresponding to the anomalous instance, wherein the reference instance lies on or within a decision boundary, wherein the decision boundary encloses a predetermined percentage of non-anomalous instances, wherein the identification of the reference instance is performed using an optimization based algorithm;
      calculating a diagnosis score corresponding to each of the first set and the second set of sensors using the anomaly detection model, the anomalous instance and the reference instance, wherein the diagnosis score is calculated using at least one of a forward substitution method and a backward substitution method, wherein the forward substitution method comprises calculation of difference between the anomaly score corresponding to one or more artificially generated instances and the anomaly score corresponding to the reference instance for each of the first and the second set of sensors;
      sorting the diagnosis scores corresponding to each of the sensors in one of a decreasing order and an increasing order; and
      identifying, via one or more hardware processors, a predefined number of sensors as the anomalous sensors in the sorting, wherein the anomalous sensors are indicative of the anomaly in the industrial system.

11. A computer program product comprising a non-transitory computer readable medium having a computer readable program embodied therein, wherein the computer readable program, when executed on a computing device, causes the computing device to:
   receive multivariate time series data from a first set of sensors;
   convert the multivariate time series data into a plurality of finite sized time windows;
   compute a plurality of features for each of the plurality of finite sized time windows;
   receive multivariate non-time series data from a second set of sensors;
   preprocess the plurality of features and the multivariate non-time series data received from the second set of sensors to get normalized plurality of features and normalized multivariate non-time series data;
   generate an anomaly detection model using the normalized plurality of features and the normalized multivariate non-time series data;
   generate an anomaly score for each of a plurality of instances in the industrial system using the anomaly detection model, wherein the anomaly score is indicative of an anomalous instance in the industrial system if the anomaly score is more than a predefined threshold;
   identify a reference instance corresponding to the anomalous instance, wherein the reference instance lies on or within a decision boundary, wherein the decision boundary encloses a predetermined percentage of non-anomalous instances, wherein the identification of the reference instance is performed using an optimization based algorithm;
   calculate a diagnosis score corresponding to each of the first set of sensors and the second set of sensors using the anomaly detection model, the anomalous instance and the reference instance, wherein the diagnosis score is calculated using at least one of a forward substitution method and a backward substitution method, wherein the forward substitution method comprises calculation of difference between the anomaly score corresponding to one or more artificially generated instances and the anomaly score corresponding to the reference instance for each of the first and the second set of sensors;
   sort the diagnosis scores corresponding to each of the sensors in one of a decreasing order and an increasing order; and
   identify a predefined number of sensors as the anomalous sensors in the sorting, wherein the anomalous sensors are indicative of the anomaly in the industrial system.

* * * * *